(12) United States Patent
Shinozaki et al.

(10) Patent No.: US 12,255,360 B2
(45) Date of Patent: Mar. 18, 2025

(54) FUEL CELL SEPARATOR

(71) Applicant: TOYOTA SHATAI KABUSHIKI KAISHA, Kariya (JP)

(72) Inventors: Yoshinori Shinozaki, Kariya (JP); Satoshi Futami, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 399 days.

(21) Appl. No.: 17/791,457

(22) PCT Filed: Dec. 2, 2020

(86) PCT No.: PCT/JP2020/044845
§ 371 (c)(1),
(2) Date: Jul. 7, 2022

(87) PCT Pub. No.: WO2021/199500
PCT Pub. Date: Oct. 7, 2021

(65) Prior Publication Data
US 2023/0034374 A1    Feb. 2, 2023

(30) Foreign Application Priority Data

Mar. 30, 2020 (JP) ................................ 2020-060917

(51) Int. Cl.
*H01M 8/0265* (2016.01)
*H01M 8/10* (2016.01)

(52) U.S. Cl.
CPC .. *H01M 8/0265* (2013.01); *H01M 2008/1095* (2013.01)

(58) Field of Classification Search
CPC ....... H01M 8/0265; H01M 2008/1095; H01M 8/0254; H01M 8/0258; H01M 8/10; Y02E 60/50
See application file for complete search history.

(56) References Cited

U.S. PATENT DOCUMENTS

2018/0198153 A1    7/2018   Jung et al.
2021/0408558 A1    12/2021  Morozumi et al.

FOREIGN PATENT DOCUMENTS

| CN | 108028397 A | 5/2018 |
|---|---|---|
| CN | 108258261 A | 7/2018 |
| CN | 109065907 A | 12/2018 |

(Continued)

OTHER PUBLICATIONS

Chinese Office Action issued in corresponding application No. 202080090991.0, dated Aug. 18, 2023.

(Continued)

*Primary Examiner* — Helen Oi K Conley
(74) *Attorney, Agent, or Firm* — Maschoff Brennan

(57) ABSTRACT

A separator for a fuel cell includes protrusions that extend in parallel and are spaced apart from each other. The protrusions are configured to contact a power generation portion. The separator includes a gas passage that extends between two adjacent ones of the protrusions along the protrusions. The gas passage is configured to allow reactant gas to flow through the gas passage. The gas passage includes at least one rib that protrudes toward the power generation portion and extends in an extending direction of the gas passage. A downstream end of the rib includes a gradually-changing portion that gradually becomes farther from the power generation portion toward a downstream side.

5 Claims, 4 Drawing Sheets

(56) References Cited

FOREIGN PATENT DOCUMENTS

| | | |
|---|---|---|
| CN | 110289432 A | 9/2019 |
| JP | 2004-241141 A | 8/2004 |
| JP | 2007-220686 A | 8/2007 |
| JP | 2019-204659 A | 11/2019 |
| WO | 2012/035585 A1 | 3/2012 |

OTHER PUBLICATIONS

CN Office Action dated Feb. 29, 2024 as received in Application No. 202080090991.0.

FUEL CELL SEPARATOR

TECHNICAL FIELD

The present disclosure relates o a separator for a fuel cell

BACKGROUND ART

Conventionally, polymer electrolyte fuel cells include a stack in which cells are stacked (see, for example, Patent Literature 1). Each cell includes a power generation portion and two metal separators. The power generation portion includes a membrane electrode assembly and is held between the separators. The separators each include projections and recesses that are alternately formed.

The projections and the recesses define a gas passage between each separator and the power generation portion of the cell such that reactant gas flows through the gas passages.

CITATION LIST

Patent Literature

Patent Literature 1: Japanese Laid-Open Patent Publication No. 2019-204659

SUMMARY OF INVENTION

Technical Problem

In the fuel cell, power is generated when reactant gas in the gas passage reaches the pow generation portion. Thus, it is preferred that the flow rate of reactant gas be high in the vicinity of the power generation portion in the gas passage. Accordingly, it is desired that the flow speed of reactant gas be increased in the vicinity of the power generation portion in the gas passage.

However, the flow speed of reactant gas in the gas passages is lower in a region in the vicinity of the power generation portion than in a middle region of each projection in its protruding direction. Thus, there is room for improvement to increase the power generating performance of the fuel cell.

It is an objective of the present disclosure to provide a separator for a fuel cell capable of increasing the flow speed of reactant gas in the vicinity of a power generation portion.

Solution to Problem

A separator for a fuel cell that achieves the above-described objective is configured to contact a power generation portion of the fuel cell. The separator includes protrusions that extend in parallel and are spaced apart from each other. The protrusions are configured to contact the power generation portion. The separator includes a gas passage that extends between two adjacent ones of the protrusions along the protrusions. The gas passage is configured to allow reactant gas to flow through the gas passage. A downstream side in a flow direction of the reactant gas flowing through the gas passage is referred to as a downstream side. The gas passage includes at least one rib that protrudes toward the power generation portion and extends in an extending direction of the gas passage. A downstream end of the rib includes a gradually-changing portion that gradually becomes farther from the power generation portion toward the downstream side.

In this structure, a portion of the gas passage where the rib is disposed has a smaller cross-sectional flow area than other portions of the gas passage. Since the gradually-changing portion of the rib is inclined so as to become farther from the power generation portion toward the downstream side, the cross-sectional flow area of a portion of the gas passage where the gradually-changing portion is disposed gradually increases toward the downstream side. Such an increase in the cross-sectional flow area gradually occurs from the power generation portion.

Accordingly, reactant gas flows faster when passing through the portion of the gas passage where the rib is disposed. The reactant gas flowing faster flows toward the side on which the cross-sectional flow area increases, that is, toward the power generation portion when passing through the gradually-changing portion of the rib. This increases the flow speed of the reactant gas in the vicinity of the power generation portion.

In the separator for the fuel cell, it is preferred that the at least one rib include ribs that are arranged in parallel and spaced apart from each other in an arrangement direction of the protrusions.

In such a structure, the distance between two adjacent ones of the ribs is adjusted so as to limit an increase in the pressure drop of reactant gas, caused by the arrangement of the ribs, and increase the flow speed of reactant gas in the vicinity of the power generation portion.

In the separator for the fuel cell, it is preferred that the ribs include two adjacent ribs in the arrangement direction and that the gradually-changing portions of the two adjacent ribs be located at the same position in the extending direction.

In this structure, the gradually-changing portions allow the reactant gas passing through the space between two adjacent ones of the ribs to easily flow toward the power generation portion and easily flow toward the opposite sides in the arrangement direction of the protrusions. This increases the flow speed of the reactant gas in the vicinity of the power generation portion in a broader range.

In the separator for the fuel cell, it is preferred that a protruding end surface of the rib and a top surface of each of the protrusions be coplanar.

In this structure, the protruding end surface of the ribs are in contact with the power generation portion together with the top surfaces of the protrusions. Thus, as compared with when the ribs are not in contact with the power generation portion, the rate of change in the cross-sectional flow area increases between the portion of the gas passage where the ribs are disposed and the portion of the gas passage where the ribs are not disposed. As a result, the pressure difference in reactant gas increases between these portions. Thus, reactant gas flows toward the power generation portion more easily. This further increases the flow speed of the reactant gas in the vicinity of the power generation portion.

In the separator for the fuel cell, it is preferred that an entirety of a protruding end surface of the rib be located between a top surface of each of the protrusions and a bottom of the gas passage in a protruding direction of the protrusions.

In this structure, the ribs are not in contact with the power generation portion. This prevents the power generation portion from being closed by the ribs. Accordingly, a decrease in the power generating performance of the fuel cell is limited.

In the separator for the fuel cell, it is preferred that a widened portion be located downstream of the gradually-changing portion and adjacent to the gradually-changing portion, the widened portion having a larger cross-sectional flow area than a portion of the gas passage where the gradually-changing portion is disposed.

In this structure, a region of the gas passage having a larger cross-sectional flow area than the portion where the gradually-changing portions are disposed (i.e., a region of the gas passage having a smaller pressure drop in reactant gas than that portion) is located downstream of the gradually-changing portions and adjacent to the gradually-changing portions. This ensures that the above-described first operational advantage of the separator for the fuel cell is provided.

Advantageous Effects of Invention

The present disclosure increases the flow speed of the reactant gas in the vicinity of the power generation portion.

DESCRIPTION OF EMBODIMENTS

Figure 1:
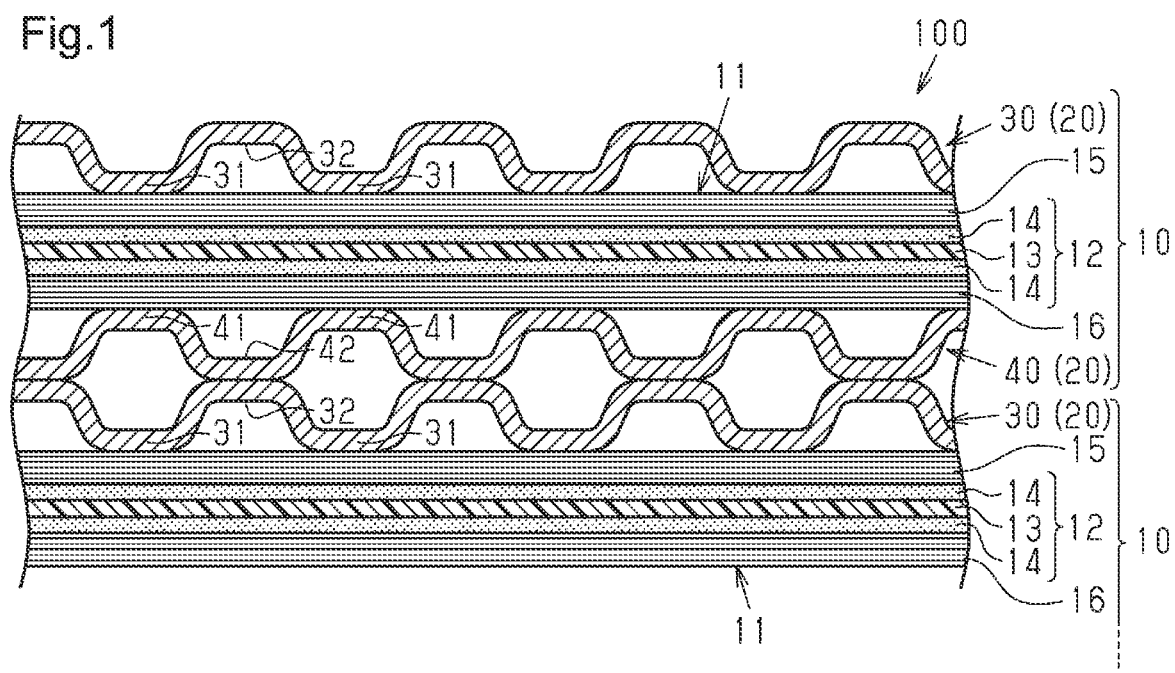
FIG. 1 is a cross-sectional view of a separator or a fuel cell according to an embodiment, mainly showing cells each including the separator.

A separator for a fuel cell according to an embodiment will now be described with reference to FIGS. 1 to 3.

For illustrative: purposes, some parts of the structures in the drawings may be exaggerated or simplified. Further, the dimensional ratios of the components may be different from actual ones.

As shown in FIG. 1, a separator for a fuel cell of the present embodiment (hereinafter referred to as the separator 20) is used for a stack 100 of a polymer electrolyte fuel cell. The separator 20 is a collective term for a first separator 30 and a second separator 40, which will be described later.

The stack 100 includes a structure in which cells 10 are stacked. Each cell 10 includes the first separator 30 on an anode side, the second separator 40 on a cathode side, and a power generation portion 11 held between the first separator 30 and the second separator 40.

The power generation portion 11 includes a membrane electrode assembly 12, an anode-side gas diffusion layer 15, and a cathode-side gas diffusion layer 16. The membrane electrode assembly 12 is held between the anode-side gas diffusion layer 15 and the cathode-side gas diffusion layer 16. The anode-side gas diffusion layer 15 is located between the membrane electrode assembly 12 and the first separator 30. The cathode-side gas diffusion layer 16 is located between the membrane electrode assembly 12 and the second separator 40. The anode-side gas diffusion layer 15 and the cathode-side gas diffusion layer 16 are made of carbon fibers.

The membrane electrode assembly 12 includes an electrolyte membrane 13 and two catalytic electrode layers 14.

The electrolyte membrane 13 is made of a solid polymer material that has an excellent proton conductivity in a wet state. The electrolyte membrane 13 is held between the catalytic electrode layers 14. Each catalytic electrode layer 14 supports a catalyst (e.g., platinum) in order to expedite the electrochemical reaction of reactant gas in the fuel cell.

The first separator 30 is formed by, for example, pressing a composite material that includes a carbon material (e.g., graphite) and a resin material (e.g., polypropylene) serving as binder while heating the composite material. The first separator 30 includes protrusions 31 and gas passages 32. The protrusions 31 extend in parallel and are spaced apart from each other. The protrusions 31 are configured to contact the power generation portion 11. Each gas passage 32 is arranged between two adjacent ones of the protrusions 31. The gas passage 32 is configured to allow reactant gas to flow through the gas passage 32. Each protrusion 31 is in contact with the anode-side gas diffusion layer 15. The protrusions 31 and the gas passages 3:2 extend in the direction that is orthogonal to the sheet of FIG. 1.

The second separator 40 is formed by, for example, pressing a composite material that includes a carbon material (e.g., graphite) and a resin material (e.g., polypropylene) while heating the composite material. The second separator 40 includes protrusions 41 and gas passages 42. The protrusions 41 extend in parallel and are spaced apart from each other. The protrusions 41 are configured to contact the power generation portion 11. Each gas passage 42 is arranged between two adjacent ones of the protrusions 41. The gas passage 42 is configured to allow reactant gas to flow through the gas passage 42. Each protrusion 41 is in contact with the cathode-side gas diffusion layer 16. The protrusions 41 and the gas passages 42 extend in the direction that is orthogonal to the sheet of FIG. 1.

The section of the first separator 30 defined by each gas passage 32 and the anode-side gas diffusion layer 15 includes a fuel gas passage through which fuel gas (reactant gas) flows. The section of the second separator 40 defined by each gas passage 42 and the cathode-side gas diffusion layer 16 includes an oxidizing gas passage through which oxidizing gas (reactant gas) flows. In the present embodiment, the fuel gas passing through the fuel gas passage is hydrogen, and the oxidizing gas flowing through the oxidizing gas passage is air.

The rear surface of the bottom of each gas passage 3:2 of the first separator 30 and the rear surface of the bottom of the gas passage 42 of the second separator 40 adjacent to the first separator 30 are joined to each other through, for example, laser welding. The section defined by the rear surface of the protrusion 31 of the first separator 30 and the rear surface of the protrusion 41 of the second separator 40 includes a coolant passage through which coolant flows.

Figure 2:
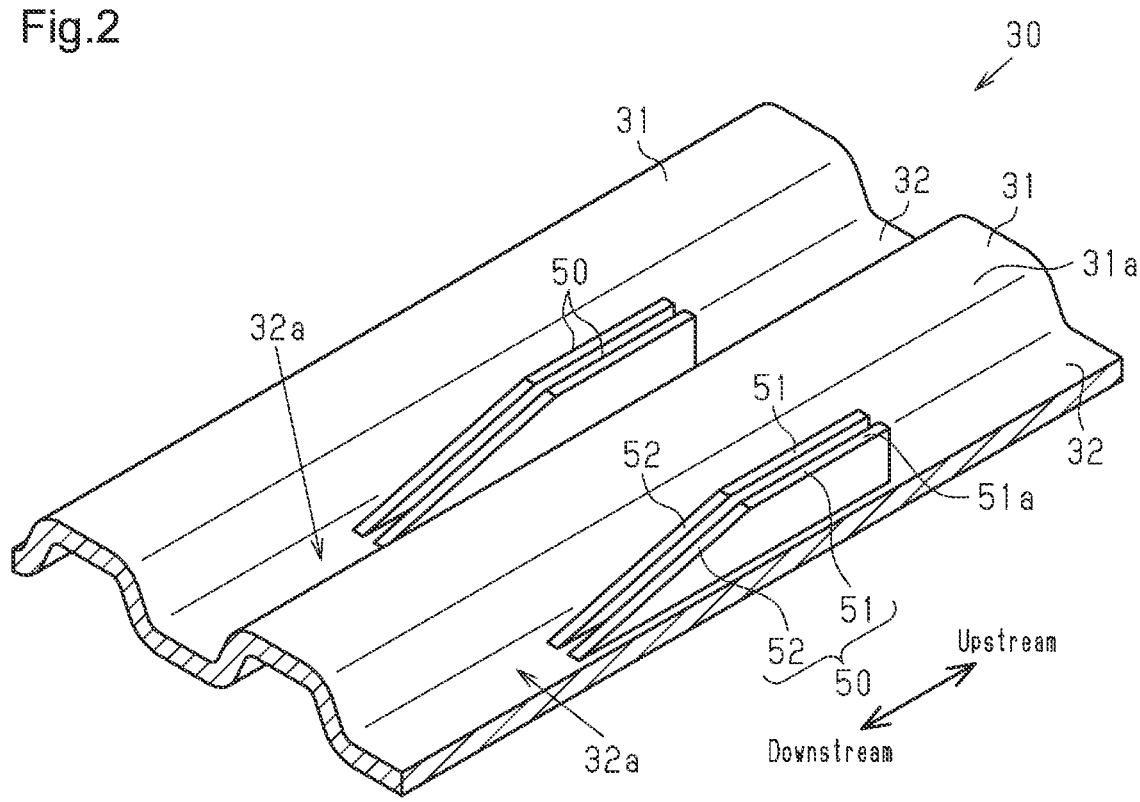
FIG. 2 is a perspective view showing the separator for the fuel cell according to the embodiment.

As shown in FIG. 2, in the present embodiment, each gas passage 32 of the first separator 30 includes plate-shaped ribs 50. Although not shown in the drawings, each gas passage 42 of the second separator 40 includes plate-shaped ribs 50. Since the first separator 30 and the second separator 40 have the same structure in the present embodiment, the ribs 50 of the first separator 30 will be hereinafter described and the ribs 50 of the second separator 40 will not be described.

The arrangement direction of the protrusions 31 is hereinafter simply referred to as the arrangement direction. The extending direction of the gas passages 32 is hereinafter simply referred to as the extending direction. In the present embodiment, the arrangement direction is orthogonal to the extending direction. The upstream side in the flow direction of reactant gas flowing through the gas passages 32 is simply referred to as the upstream side. The downstream side in the flow direction is simply referred to as the downstream side.

Figure 3:
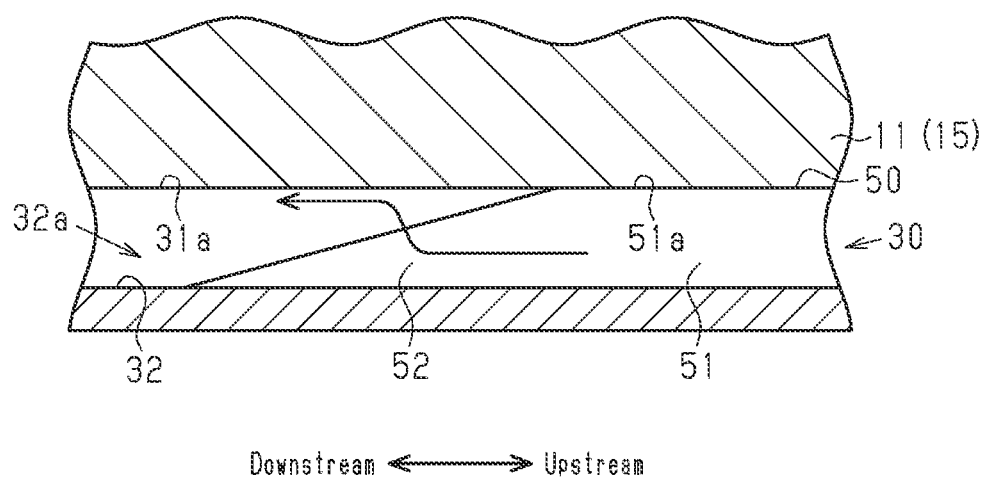
FIG. 3 is a cross-sectional view showing the separator for the fuel cell according to the embodiment.

As shown in FIGS. 2 and 3, the ribs 50 protrude from the bottom of the gas passage 32 toward the power generation portion 11 and extend in the extending direction. Each rib 50 includes an extension 51 and a gradually-changing portion 52. The extension 51 extends in contact with the power generation portion 11. The gradually-changing portion 52 is continuous with the downstream end of the extension 51 and located at the downstream end of the rib 50.

As shown in FIG. 3, a protruding end surface 51a of each extension 51 and a top surface 31.a of the corresponding protrusion 31 are coplanar. That is, the entire extension 51 is in contact with the power generation portion 11 in the extending direction. More specifically, the entire extension 51 of the rib 50 of the first separator 30 is in contact with the anode-side gas diffusion layer 15 in the extending direction. The entire extension 51 of the rib 50 of the second separator 40 is in contact with the cathode-side gas diffusion layer 16 in the extending direction.

The gradually-changing portion 52 is inclined so as to gradually become farther from the power generation portion 11 toward the downstream side. In other words, the gradually-changing portion 52 is inclined such that the protrusion amount from the bottom of the gas passage 32 decreases toward the downstream side. The gradually-changing portion 52 of the present embodiment is triangular as viewed in the arrangement direction.

The inclination angle of the gradually-changing portion 52 relative to the bottom of the gas passage 32 is preferably, for example, between 15° and 45°. The inclination angle of the gradually-changing portion 52 in the present embodiment is 15°.

As shown in FIG. 2, each gas passage 32 of the present embodiment includes a pair of ribs 50 that are arranged in parallel and spaced apart front each other in the arrangement direction. The ribs 50 are located at positions separated from the adjacent protrusions 31 in the arrangement direction. That is, a gap is formed between each rib 50 and the protrusion 31 adjacent to the rib 50. Although not shown in the drawings, the gas passage 32 includes pairs of ribs 50 that are spaced apart from each other in the extending direction.

Two adjacent ones of the gradually-changing portions 52 are located at the same position in the extending direction. In the present embodiment, the ribs 50 have the same shape. Thus, two adjacent ones of the gradually-changing portions 52 are entirely located at the same position in the extending direction.

A widened portion 32a is located downstream of the gradually-changing portions 52 and adjacent to the gradually-changing portions 52. The widened portion 32a has a larger cross-sectional flow area than a portion of the gas passage 32 where the gradually-changing portions 52 are disposed. The widened portion 32a of the present embodiment is a portion of the gas passage 32 where the ribs 50 are not disposed.

The operation of the present embodiment will now be described.

The portion of each gas passage 32 where the ribs 50 are disposed has a smaller cross-sectional flow area than other portions of the gas passage 32. Since the gradually-changing portion 52 of each rib 50 is inclined so as to gradually become farther from the power generation portion 11 toward the downstream side, the cross-sectional flow area of a portion of the gas passage 32 where the gradually-changing portion 52 is disposed gradually increases toward the downstream side. Such an increase in the cross-sectional flow area gradually occurs from the power generation portion 11.

Accordingly, reactant gas flows faster when passing through the portion of the gas passage 32 where the ribs 50 are disposed (i.e., through the space between a pair of ribs 50 and the space between each rib 50 and the corresponding protrusion 31). The reactant gas flowing faster flows toward the side on which the cross-sectional flow area increases (i.e., toward the power generation portion 11) when passing through the gradually-changing portions 52 of the ribs 50.

As shown by the arrow in FIG. 3, the flow of the reactant gas toward the power generation portion 11 flows in an orientation that is generally orthogonal to the oblique side of the gradually-changing portion 52. Thus, the reactant gas reaches the power generation portion 11 on the upstream side more easily when the inclination angle of the gradually-changing portion 52 is 15° than when, for example, the inclination angle of the gradually-changing portion 52 is 45°.

The advantages of the present embodiment will now be described.

(1) The gas passages 32 each include the ribs 50. The ribs 50 protrude toward the power generation portion 11 and extend in the extending direction of the gas passages 32. The downstream end of each rib 50 includes the gradually-changing portion 52. The gradually-changing portion 52 gradually becomes farther from the power generation portion 11 toward the downstream side.

This structure provides the above-described operation and thus increases the flow speed of the reactant gas in the vicinity of the power generation portion 11.

(2) The ribs 50 are arranged in parallel and spaced apart from each other in the arrangement direction of the protrusions 31.

In such a structure, the distance between two adjacent ones of the ribs 50 is adjusted so as to limit an increase in the pressure drop of reactant gas, caused by the arrangement of the ribs 50, and increase the flow speed of reactant gas in the vicinity of the power generation portion 11.

(3) The gradually-changing portions 52 of two adjacent ones of the ribs 50 are located at the same position in the extending direction.

In this structure, the gradually-changing portions 52 allow the reactant gas passing through the space between two adjacent ones of the ribs 50 to easily flow toward the power generation portion 11 and easily flow toward the opposite sides in the arrangement direction. This increases the flow speed of the reactant gas in the vicinity of the power generation portion 11 in a broader range.

(4) The protruding end surfaces Ma of the ribs 50 and the top surfaces 31a of the protrusions 31 are coplanar.

In this structure, the protruding end surfaces 51a of the extensions 51 are in contact with the power generation portion 11 together with the top surfaces 31a of the protrusions 31. Thus, as compared with when the ribs 50 are not in contact with the power generation portion 11, the rate of change in the cross-sectional flow area increases between the portion of the gas passage 32 where the ribs 50 are disposed and the portion of the gas passage 32 where the ribs 50 are not disposed. As a result, the pressure difference in reactant gas increases between these portions. Thus, reactant gas flows toward the power generation portion 11 more easily. This further increases the flow speed of the reactant gas in the vicinity of the power generation portion 11.

(5) The widened portion 32a is located downstream of the gradually-changing portions 52 and adjacent to the gradually-changing portions 52. The widened portion 32a has a larger cross-sectional flow area than the portion of the gas passage 32 where the gradually-changing portions 52 are disposed.

In this structure, a region of the gas passage 32 having a larger cross-sectional flow area than the portion where; the gradually-changing portions 52 are disposed (i.e., a region of the gas passage 32 having a smaller pressure drop in reactant gas than that portion) is located downstream of the gradually-changing portions 52 and adjacent to the gradually-changing portions 52. This ensures that the above-described advantage (1) is provided.

Modifications

The present embodiment may be modified as follows. The present embodiment and the following modifications can be combined as long as they remain technically consistent with each other.

In the following first to fourth modifications respectively shown in FIGS. 4 to 7, the same components as those in the above-described embodiment are given the same reference numbers. Also, the components that correspond to those in the above-described embodiments are given reference numbers obtained by adding 100, 200, 300, and 400 to the reference numbers of the components of the above-described embodiments, and will not be described.

Figure 4:
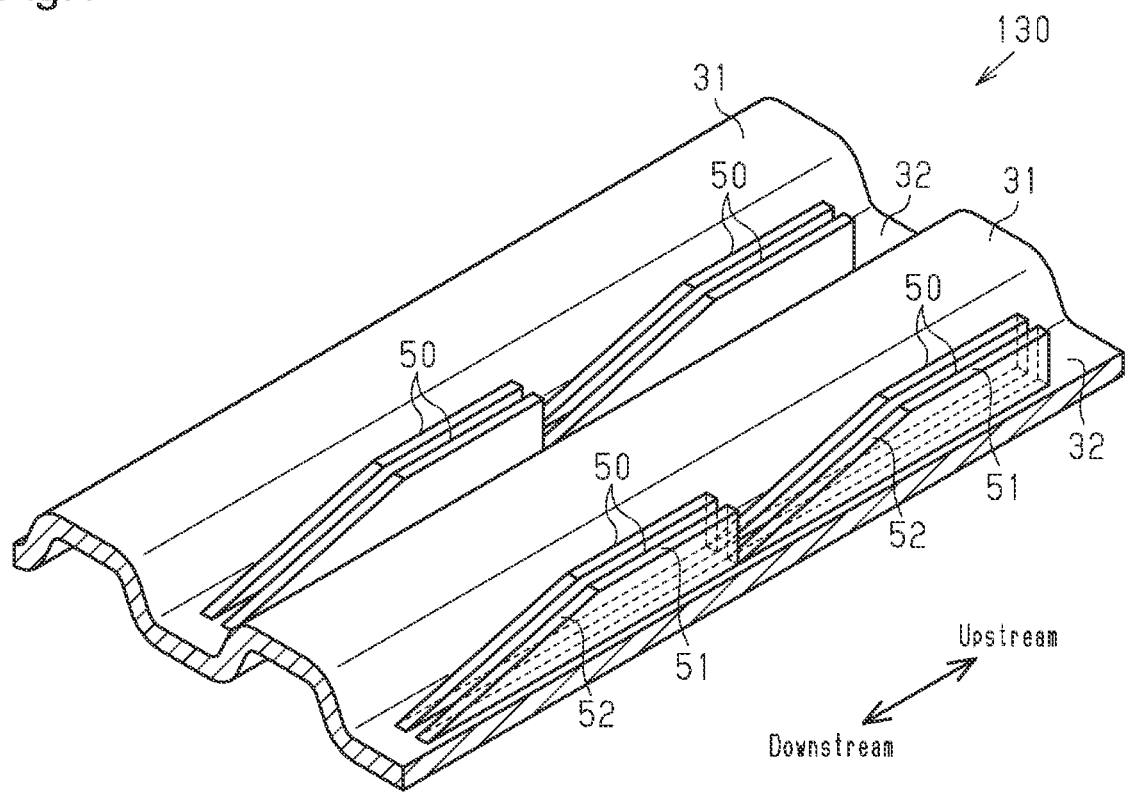
FIG. 4 is a perspective view showing the separator for the fuel cell according to a first modification.

As shown in FIG. 4, the widened portion 32a may be replaced with two pairs of ribs 50 adjacent to each other in the extending direction. In this modification, the gradually-changing portions 52 of the upstream ribs 50 and the extensions 51 of the downstream ribs 50 are continuous with each other in the extending direction.

Figure 5:
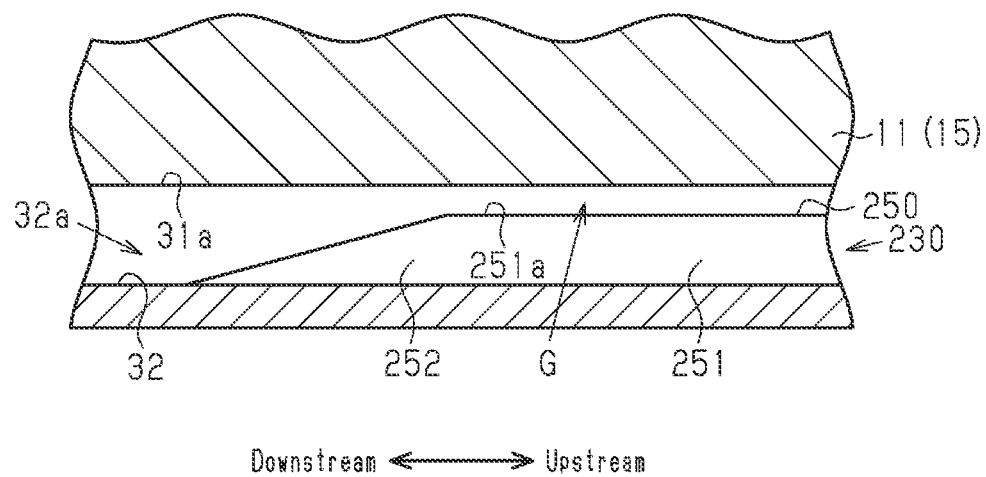
FIG. 5 is a cross-sectional view showing e separator for the fuel cell according to a second modification.

As shown in FIG. 5, the entirety of a protruding end surface 251a of an extension 251 may be located between the top surface 31a of each protrusion 31 and the bottom of the gas passage 32 in the protruding direction (upward direction in FIG. 5) of the protrusion 31. That is, a gap G may be formed between the ribs 50 and the power generation portion 11 over the entire gas passage 32 in the extending direction. In such a structure, the ribs 50 are not in contact with the power generation portion 11. This prevents the power generation portion 11 from being closed by the ribs 50. Accordingly, a decrease in the power generating performance of the fuel cell is limited.

Only part of each rib 50 in the extending direction may be in contact with the power generation portion 11.

Figure 6:
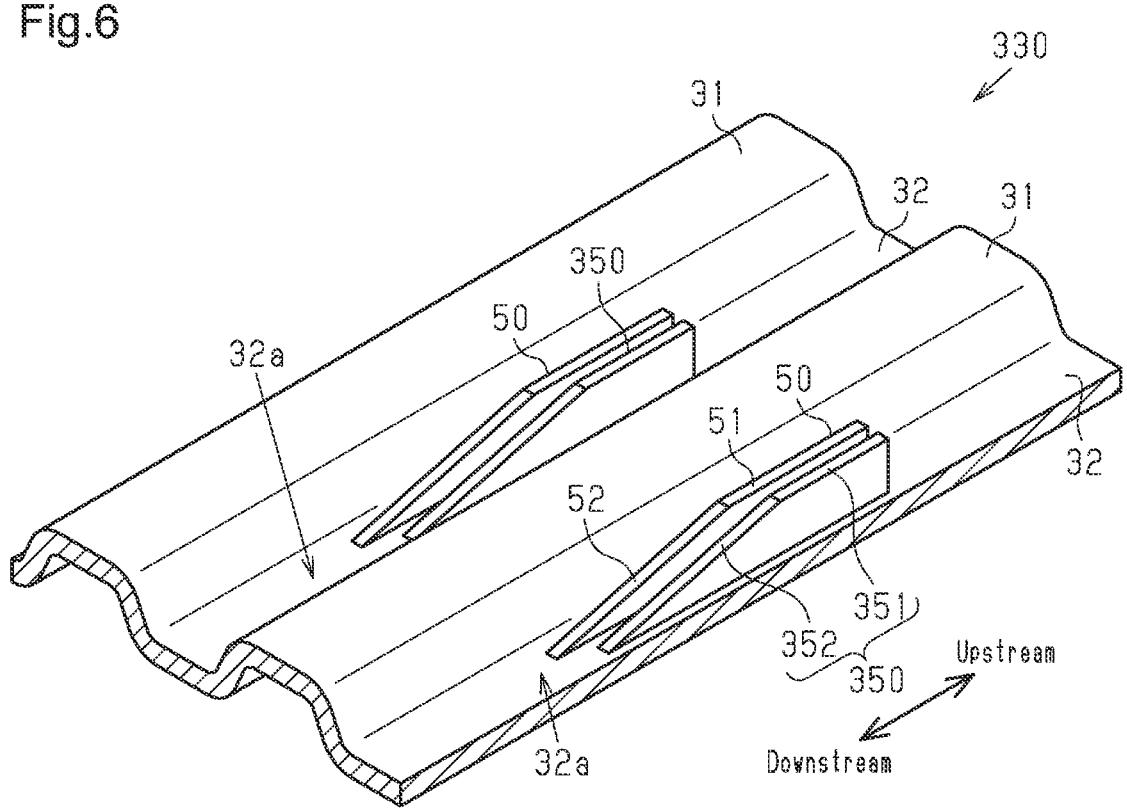
FIG. 6 is a perspective view showing the separator for the fuel cell according a third modification

The gradually-changing portions 52 of two adjacent ones of the ribs 50 may each be located at a different position in the extending direction. As shown in FIG. 6, this structure may include ribs 50 and ribs 350 each having an extension 351 that is shorter than the extension 51 of the corresponding rib 50 in the extending direction. Further, the upstream edges of the extensions 51, 351 may be located at the same position in the extending direction.

Each gas passage 32 may include a single rib 50. Even in this case, the cross-sectional flow area is reduced between the rib 50 and the protrusion 31 adjacent to the rib 50 and thus the above-described advantage (1) is provided.

Each gas passage 32 may include three or more ribs 50 that are arranged in parallel and spaced apart from each other in the arrangement direction.

Figure 7:
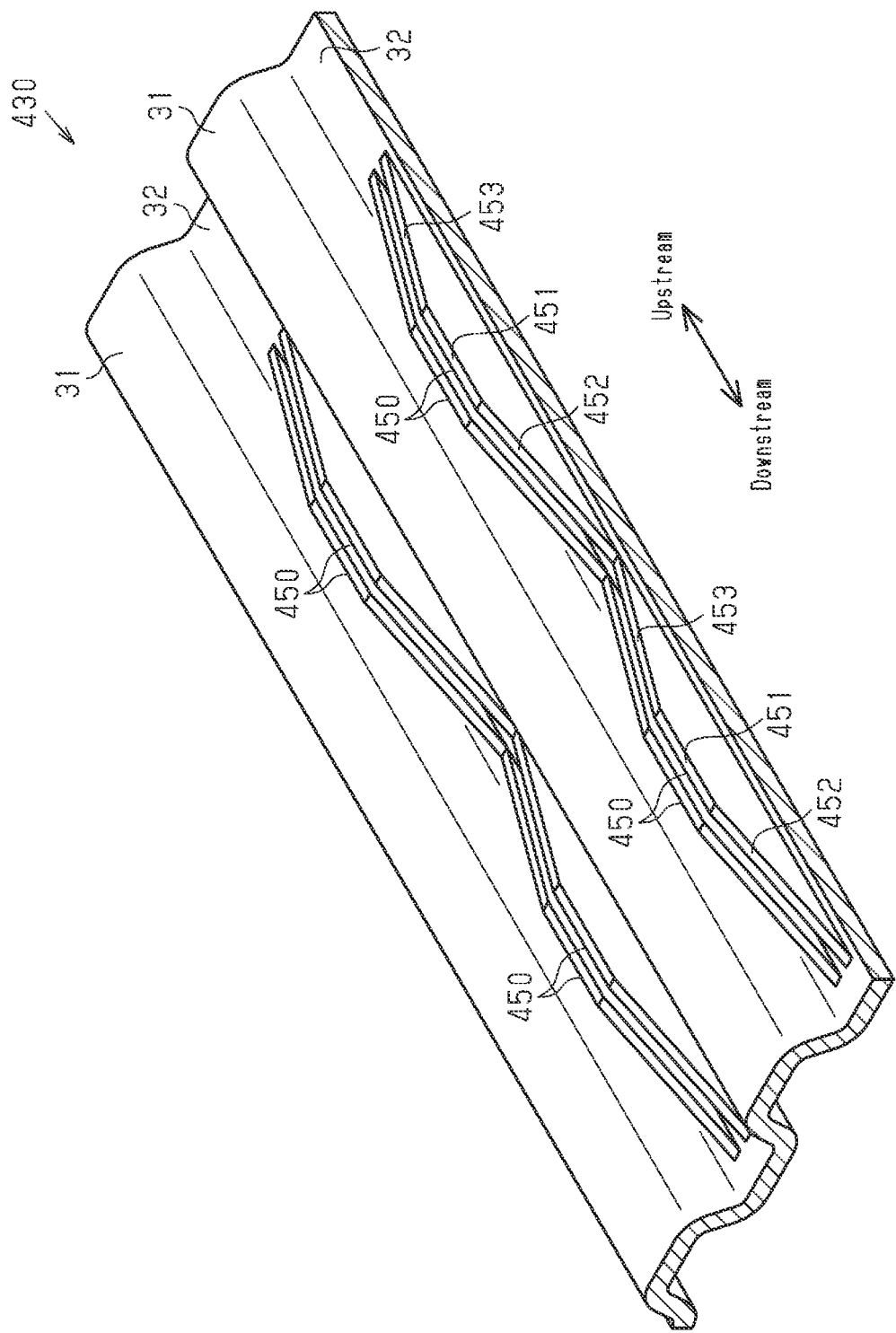
FIG. 7 is a perspective view showing the separator for the fuel cell according to a fourth modification.

As shown in FIG. 7, ribs 450 may each include a gradually-changing portion 453 at the upstream end in addition to a gradually-changing portion 452 at the downstream end. The gradually-changing portion 453 is inclined so as to gradually become farther from the power generation portion 11 toward the upstream side. That is, the gradually-changing portion 453 is inclined such that the protrusion amount from the bottom of the gas passage 32 decreases toward the upstream side. In this modification, two pairs of ribs 450 are adjacent to each other in the extending direction. That is, the gradually-changing portion 452 of each upstream rib 450 is continuous with the gradually-changing portion 453 of the corresponding downstream rib 450 in the extending direction. In this structure, when reactant gas that has passed through the space between the gradually-changing portions 452 of the upstream ribs 450 flows toward the power generation portion 11, some of the reactant gas flows along the gradually-changing portions 453 of the downstream ribs 450. Thus, the reactant gas easily flows toward the power generation portion 11.

The inclination angle of the gradually-changing portion 52 relative to the bottom of the gas passage 32 may be changed.

The gradually-changing portion 52 may include steps so as to be step-shaped shape as viewed in the arrangement direction. Even in this case, the gradually-changing portion 52 gradually becomes farther from the power generation portion 11 toward the downstream side. Thus, the above-described advantage (1) is provided.

In the present embodiment, the first separator 30 and the second separator 40 both include the ribs 50. Instead, only the first separator 30 may include the ribs 50. Alternatively, only the second separator 40 may include the ribs 50.

The separator 20 may be made of a metal material (e.g., stainless steel)

REFERENCE SIGNS LIST

G) Gap
10) Cell
11) Power Generation Portion
12) Membrane Electrode Assembly
13) Electrolyte Film
14) Catalytic Electrode Layer
15) Anode-Side Gas Diffusion Layer
16) Cathode-Side Gas Diffusion Layer
20) Separator
30, 130, 230, 330, 430) First separator
31) Protrusion
31a) Top Surface
32) Gas Passage
32a) Widened Portion
40) Second Separator
41) Protrusion
42) Gas Passage
50, 250, 350, 450) Rib
51, 251, 351, 451) Extension
51a, 251a) Protruding End Surface
52, 252, 352, 452) Gradually-Changing Portion
100) Stack
453) Gradually-Changing Portion

The invention claimed is:

1. A separator for a fuel cell, the separator being configured to contact a power generation portion of the fuel cell, the separator comprising:
   protrusions that extend in parallel and are spaced apart from each other, the protrusions being configured to contact the power generation portion; and
   a gas passage that extends between two adjacent ones of the protrusions along the protrusions, the gas passage being configured to allow reactant gas to flow through the gas passage, wherein a downstream side in a flow direction of the reactant gas flowing through the gas passage is referred to as a downstream side, the gas passage includes at least one rib that protrudes toward the power generation portion and extends in an extending direction of the gas passage, a downstream end of the rib includes a gradually-changing portion that gradually becomes farther from the power generation portion toward the downstream side, and the at least one rib includes ribs that are arranged in parallel and spaced apart from each other in an arrangement direction of the protrusions.

2. The separator for the fuel cell according to claim 1, wherein:

the ribs include two adjacent ribs in the arrangement direction, and the gradually-changing portions of the two adjacent ribs are located at the same position in the extending direction.

3. The separator for the fuel cell according to claim 1, wherein a protruding end surface of the rib and a top surface of each of the protrusions are coplanar.

4. The separator for the fuel cell according to claim 1, wherein an entirety of a protruding end surface of the rib is located between a top surface of each of the protrusions and a bottom of the gas passage in a protruding direction of the protrusions.

5. The separator for the fuel cell according to claim 1, wherein a widened portion is located downstream of the gradually-changing portion and adjacent to the gradually-changing portion, the widened portion having a larger cross-sectional flow area than a portion of the gas passage where the gradually-changing portion is disposed.

* * * * *